US009865181B2

(12) United States Patent
Suley et al.

(10) Patent No.: US 9,865,181 B2
(45) Date of Patent: Jan. 9, 2018

(54) USE OF STYLE SETS TO ASSIST A USER IN DIGITIZING GIS LAYERS

(71) Applicant: Rolta India Ltd, Mumbai (IN)

(72) Inventors: Milind Suley, Mumbai (IN); Trupti Pol, Mumbai (IN); Ravindra N Kondekar, Mumbai (IN); Laxmidhar V Gaopande, Mumbai (IN)

(73) Assignee: ROLTA INDIA LTD, Mumbai (IN)

( * ) Notice: Subject to any disclaimer, the term of this patent is extended or adjusted under 35 U.S.C. 154(b) by 343 days.

(21) Appl. No.: 14/277,824

(22) Filed: May 15, 2014

(65) Prior Publication Data
US 2015/0331584 A1 Nov. 19, 2015

(51) Int. Cl.
G06F 3/048 (2013.01)
G09B 29/00 (2006.01)
G06F 3/0484 (2013.01)

(52) U.S. Cl.
CPC ....... G09B 29/003 (2013.01); G06F 3/04842 (2013.01); *G06T 2207/30181* (2013.01)

(58) Field of Classification Search
CPC combination set(s) only.
See application file for complete search history.

(56) References Cited

U.S. PATENT DOCUMENTS

| 6,307,573 | B1 * | 10/2001 | Barros | G06F 17/30241 345/440 |
| 7,746,343 | B1 * | 6/2010 | Charaniya | G06F 3/04815 345/428 |
| 2004/0117358 | A1 * | 6/2004 | von Kaenel | G06F 17/30241 |
| 2006/0174209 | A1 * | 8/2006 | Barros | G06F 3/0483 715/764 |
| 2006/0230051 | A1 * | 10/2006 | Corbett | G06F 17/30241 |
| 2012/0215817 | A1 * | 8/2012 | Wheeler | G06F 17/30241 707/803 |
| 2014/0095303 | A1 * | 4/2014 | Jones | G06F 17/30867 705/14.49 |

* cited by examiner

*Primary Examiner* — Hien Duong
(74) *Attorney, Agent, or Firm* — Mannava & Kang, P.C.; Vinay Malik

(57) ABSTRACT

Embodiments disclosed herein restrict a user working on digitizing GIS features to specific style parameters. This ensures creation of data that can be exported in a lossless manner to specific systems. Embodiments disclosed herein provide a mapping between styling systems of different products. Thus when digitizing features itself, users may be restricted to specify styles in a format compatible with target data, rather than in terms of product being used for digitization. Embodiments disclosed herein provide users with a familiar styling interface through customized views associated with specific style-set. Embodiments disclosed herein provide the customizability to implement styling restrictions and provide custom GUI as per user needs for a project or an organization. Embodiments disclosed herein allow authorized entities and/or users to configure new style-sets, add new style-sets, delete existing style-sets and so on.

10 Claims, 6 Drawing Sheets

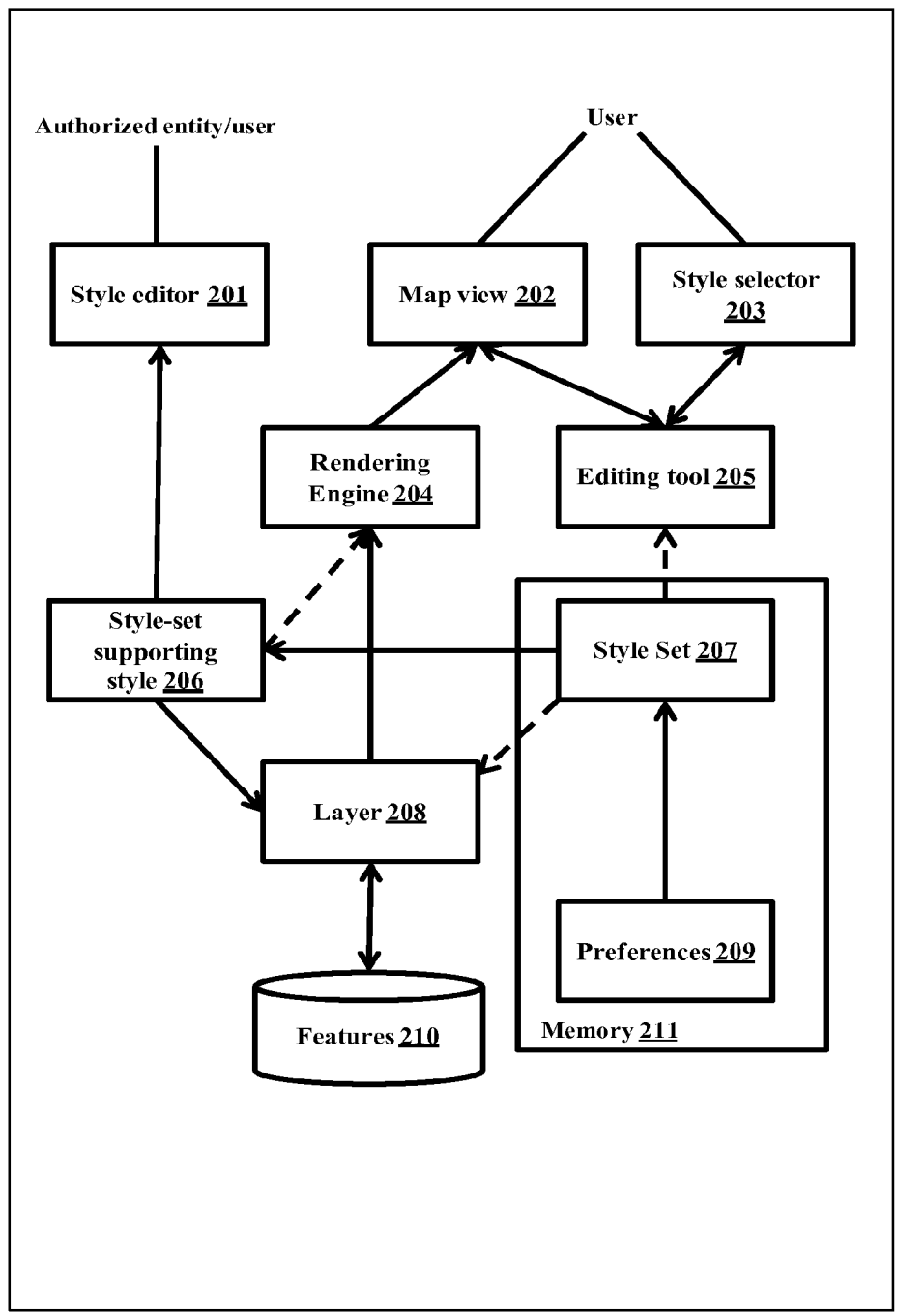

USE OF STYLE SETS TO ASSIST A USER IN DIGITIZING GIS LAYERS

TECHNICAL FIELD

The embodiments herein relate to digitization of Geographic Information Systems (GIS) features and, more particularly, to enabling users to select at least one style set during the process of digitizing GIS features.

BACKGROUND

Currently, multiple formats may be used for data exchange between existing GIS products. These formats may have certain restrictions especially in terms of styles. The products used for creating data do not understand these restrictions. Thus when it comes to converting data to this format there may be a loss in styling information.

To overcome this, GIS products provide a style library. The style library offers a set of pre-defined styles to a user, wherein the user may choose from these styles. The selected styles may then be applied to layers.

However, even within the style library, the users may choose styling elements that cannot be exported properly, thus causing loss or distortion in exported data.

BRIEF DESCRIPTION OF THE FIGURES

The embodiments herein will be better understood from the following detailed description with reference to the drawings, in which:

FIG. 2 depicts an example of an architecture configured to enable style-sets to be used with GIS applications, according to embodiments as disclosed herein;

DETAILED DESCRIPTION OF EMBODIMENTS

Figure 1A:
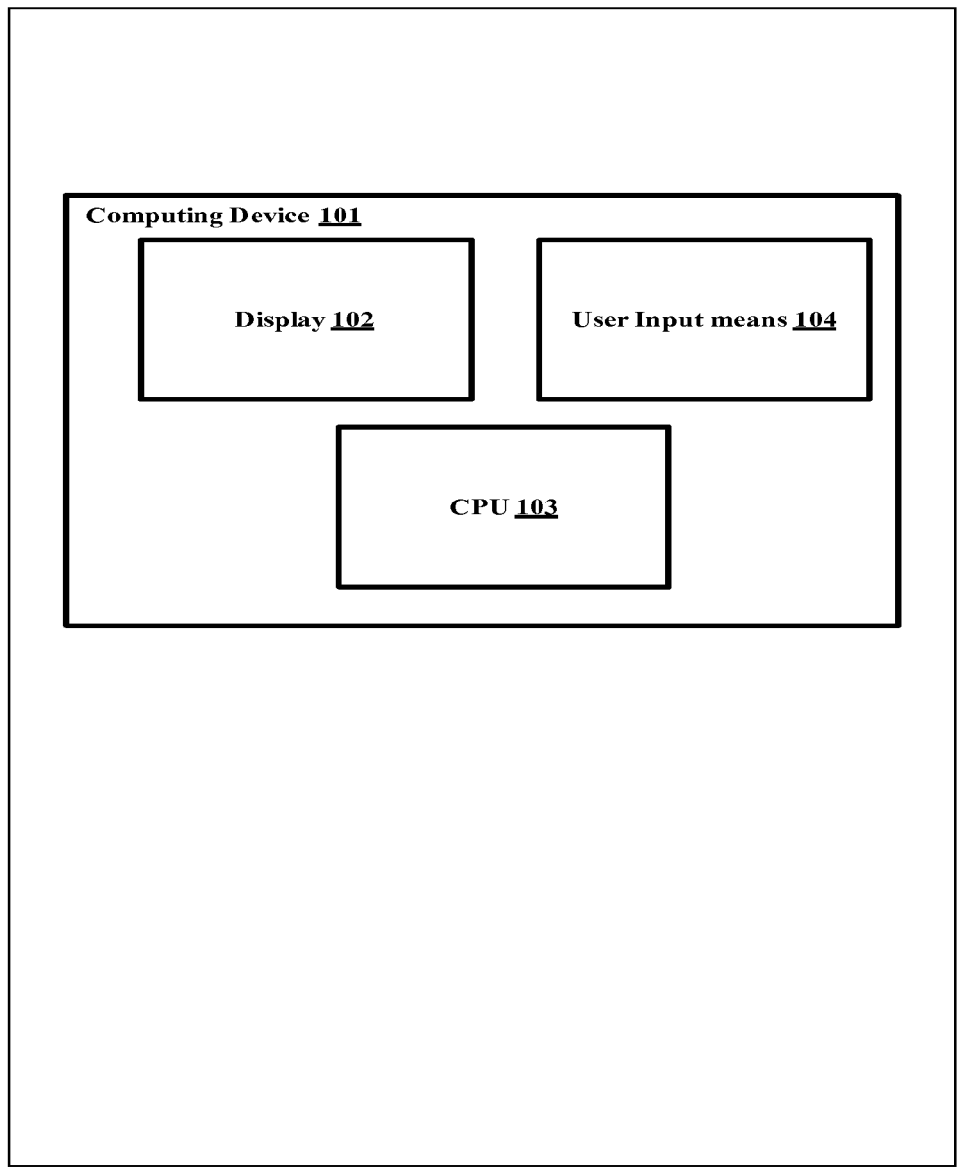
FIG. 1a illustrates a computing device comprising of a GIS application, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for enabling users to select at least one style set during the process of digitizing GIS features. Referring now to the drawings, and more particularly to FIGS. 1 through 4, where similar reference characters denote corresponding features consistently throughout the figures, there are shown embodiments.

Embodiments disclosed herein restrict a user working on digitizing GIS features to specific style parameters. This ensures creation of data that can be exported in a lossless manner to specific systems. Embodiments disclosed herein provide a mapping between styling systems of different products. Thus when digitizing features itself, users may be restricted to specify styles in a format compatible with target data, rather than in terms of product being used for digitization. Embodiments disclosed herein provide users with a familiar styling interface through customized views associated with specific style-set. Embodiments disclosed herein provide the customizability to implement styling restrictions and provide custom GUI as per user needs for a project or an organization. Embodiments disclosed herein allow authorized entities and/or users to configure new style-sets, add new style-sets, delete existing style-sets and so on.

FIG. 1a illustrates a computing device comprising of a GIS application, according to embodiments as disclosed herein. The computing device 101, as depicted, comprises of a display 102, a user input means 104 and a CPU (Central Processing Unit) 103. The computing device 101 may be at least one of a desktop computer, a laptop, a tablet, a smart phone, a mobile phone or any other device capable of accessing the GIS application. The display 102 may enable a user of the computing device 101 to view information. The display 102 may be a monitor, a separate display device connected to the other components of the computing device 101 using a cable/wire, an integrated display present in the body of the computing device 101 and so on. In an embodiment herein, the display 102 may comprise of more than one display devices. The user input means 104 may enable the user of the computing device 101 to interact with the computing device 101. The user input means 104 may comprise of at least one of a physical keyboard, a mouse, a touchpad, a joystick, an on-screen keyboard, a touchscreen and so on. The user may use more than one user input means 104 at a time to interact with the computing device 101. The CPU 103 comprises of a computing means enabling the computing device 101 to perform computing functions. The CPU 103 may be a separate device connected to the display 102 and the user input means 104 using a suitable means such as cable/wires and so on. The CPU 103 may be integrated with at least one of the display 102 and the user input means 104. The CPU 103 enables the user to access and operate the GIS application. The GIS application may be a browser based application (web application), which may be accessed by the user using a browser present on the computing device 101. The GIS application may be a stand-alone GUI (Graphical User Interface) based application, which the user may access directly using the computing device 101.

Figure 1B:
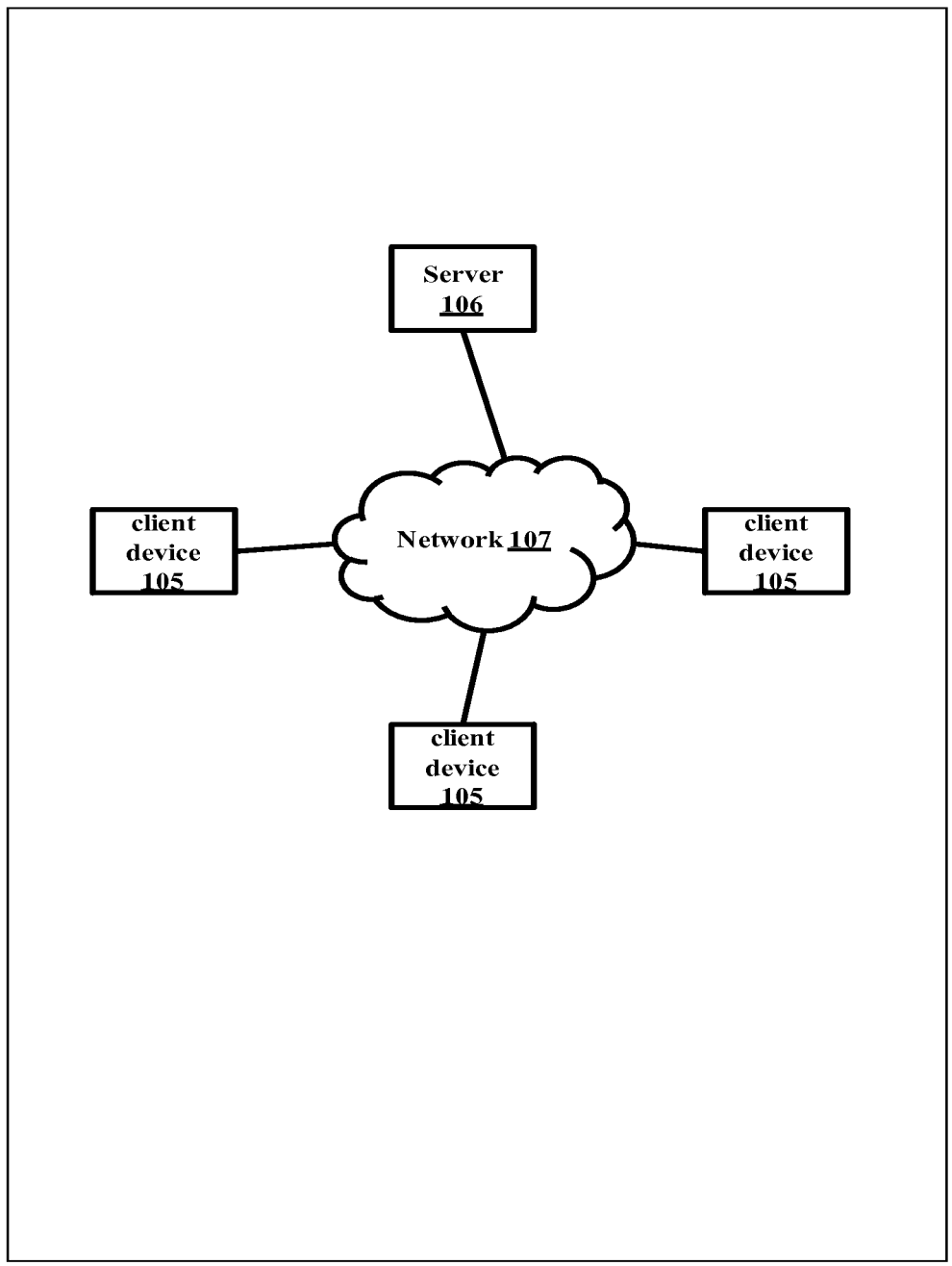
FIG. 1b illustrates a system comprising of plurality of clients connected to a server through a network, wherein the network enables the client to access the GIS application present on the server, according to embodiments as disclosed herein.

FIG. 1b illustrates a system comprising of plurality of clients connected to a server through a network, wherein the network enables the client to access the GIS application present on the server, according to embodiments as disclosed herein. The system comprises of a plurality of client devices 105 connected to at least one server 106 through a network 107. The client device 105 may be at least one of a desktop computer, a laptop, a tablet, a smart phone, a mobile phone or any other device capable of accessing the GIS application using the network 107. The network 107 may be at least one of the internet, a LAN (Local Area Network), a WAN (Wide Area Network) and so on, which may enable a plurality of client devices 105 to access the GIS application resident on the server 106. The GIS application may be a browser based application (web application), which may be accessed by the user from the server 106 using a browser present on the client device 105. The GIS application may be a stand-alone GUI (Graphical User Interface) based application, which the user may access directly using the client device 105.

Figure 1C:
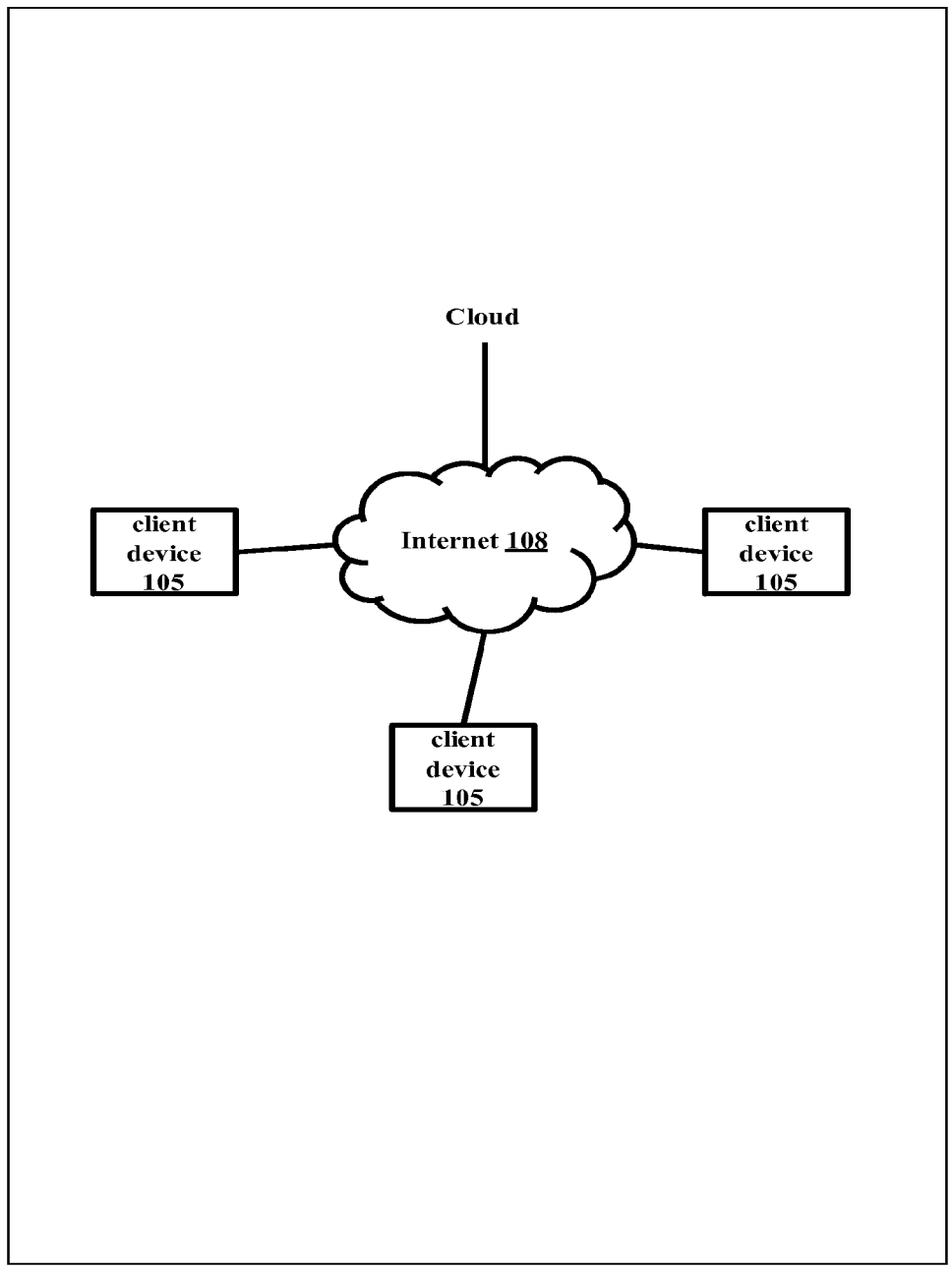
FIG. 1c illustrates a plurality of clients connected to the cloud, wherein the internet enables the client to access the GIS application present on the cloud, according to embodiments as disclosed herein.

FIG. 1c illustrates a plurality of clients connected to the cloud, wherein the internet enables the client to access the GIS application present on the cloud, according to embodiments as disclosed herein. FIG. 1c depicts a plurality of client devices 105 connected to the cloud through the internet 108. The client device 105 may be at least one of a desktop computer, a laptop, a tablet, a smart phone, a mobile phone or any other device capable of accessing the GIS application using the network 107. The client device 105 may access the GIS application through the cloud. The GIS application may be a browser based application (web application), which may be accessed by the user from cloud using a browser present on the client device 105. The GIS application may be a stand-alone GUI (Graphical User Interface) based application, which the user may access directly using the client device 105.

FIG. 2 depicts an example of an architecture configured to enable style-sets to be used with GIS applications, according to embodiments as disclosed herein. The architecture comprises of a style editor 201, a map view 202 (which may be at least one display, which will enable the user to view and perform operations on the map), a style selector 203, a rendering engine 204, a at least one editing tool 205, a set comprising of at least one style-set supporting style 206, a memory 211 comprising of at least one style set 207 and at least one set of corresponding preferences 209 (wherein the preferences 209 may comprise of at least one of configuration and application preferences), a layer 208 and at least one feature associated with the layer 208. The style editor 201 enables an authorized person and/or entity to define, delete and/or edit style-set compliant styles. The style set supporting style 206 comprises of information such as the mapping information between target format style system and current application's style (For example, such a style will map color attribute of target format, say [1-255], to specific RGB values that correspond to each of possible target format values, like 1 may map to BLACK, 2 may map to RED and so on). The style selector 203 may enable a user to select style elements like color, width, pattern values that are compatible with target format. The style selector 203 may read the compatibility information from style-set 209 definition. Thus, the style selector 203 may interact with the editing tool 205 to provide the user with the ability to change the style of a feature in line with the style-set definition, thus feature will have style information based on the target format. The rendering engine 204 may extract the data and style information from layer, which is in target format terms, use the style 206 that has the mapping between target format and current application, and draw the extracted data to the map view 202. The editing-tools 205 may be used for editing features through the map view 202 and the modified features stored in the layer 208. The features stored have style elements compatible with target format. The definitions of the style-sets may be stored in preferences 209. The features 210 may be a database for storing data.

Figure 3:
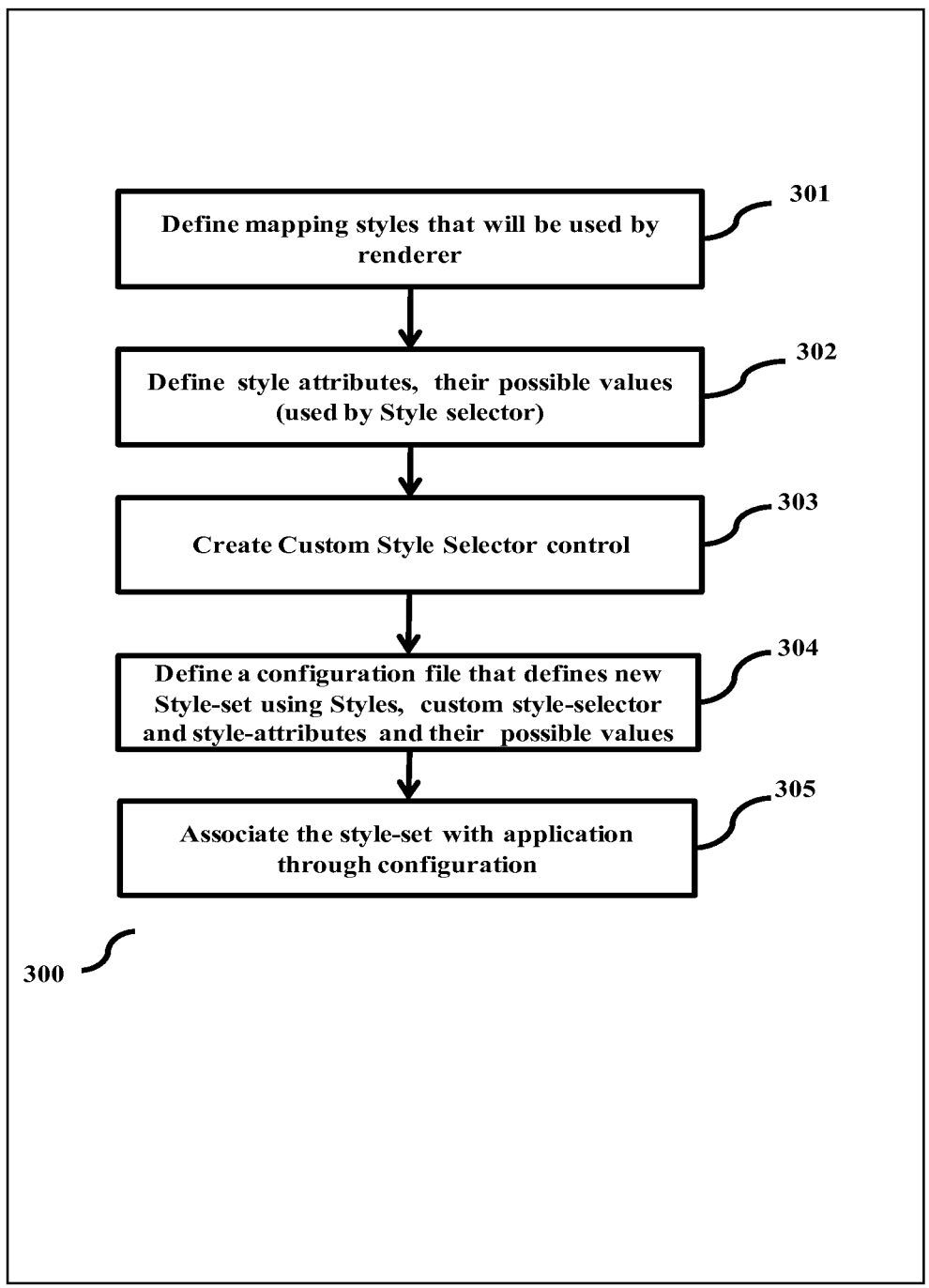
FIG. 3 is a flowchart illustrating the process of building a new style set, according to embodiments as disclosed herein.

FIG. 3 is a flowchart illustrating the process of building a new style set, according to embodiments as disclosed herein. The style set may be created by an authorized person and/or entity. The authorized person and/or entity defines (301) the styles that have mapping between target style elements and current application style elements using the style editor 201. These styles may be used by the renderer to map the style attributes of features from target format values to current application supported values. The authorized person and/or entity also defines the (302) attributes corresponding to various style elements and their possible values in a configuration file. This information may be used by the style selector 203 to restrict user choice to at least one allowed value. The authorized person and/or entity creates (303) a custom style-selector control/plug-in that works along with editing-tools and allows users to choose values compatible to target format. The style selector control/plug-in may have custom layout with custom labels and controls. The authorized person and/or entity defines (304) a configuration file storing unique name of this style set and references to styles, style attributes and their legal values and the style selector 203 (which may be a plugin). The configuration file may be of a suitable format such as a XML (Extensible Markup Language) file. The various actions in method 300 may be performed in the order presented, in a different order or simultaneously. Further, in some embodiments, some actions listed in FIG. 3 may be omitted.

Figure 4:
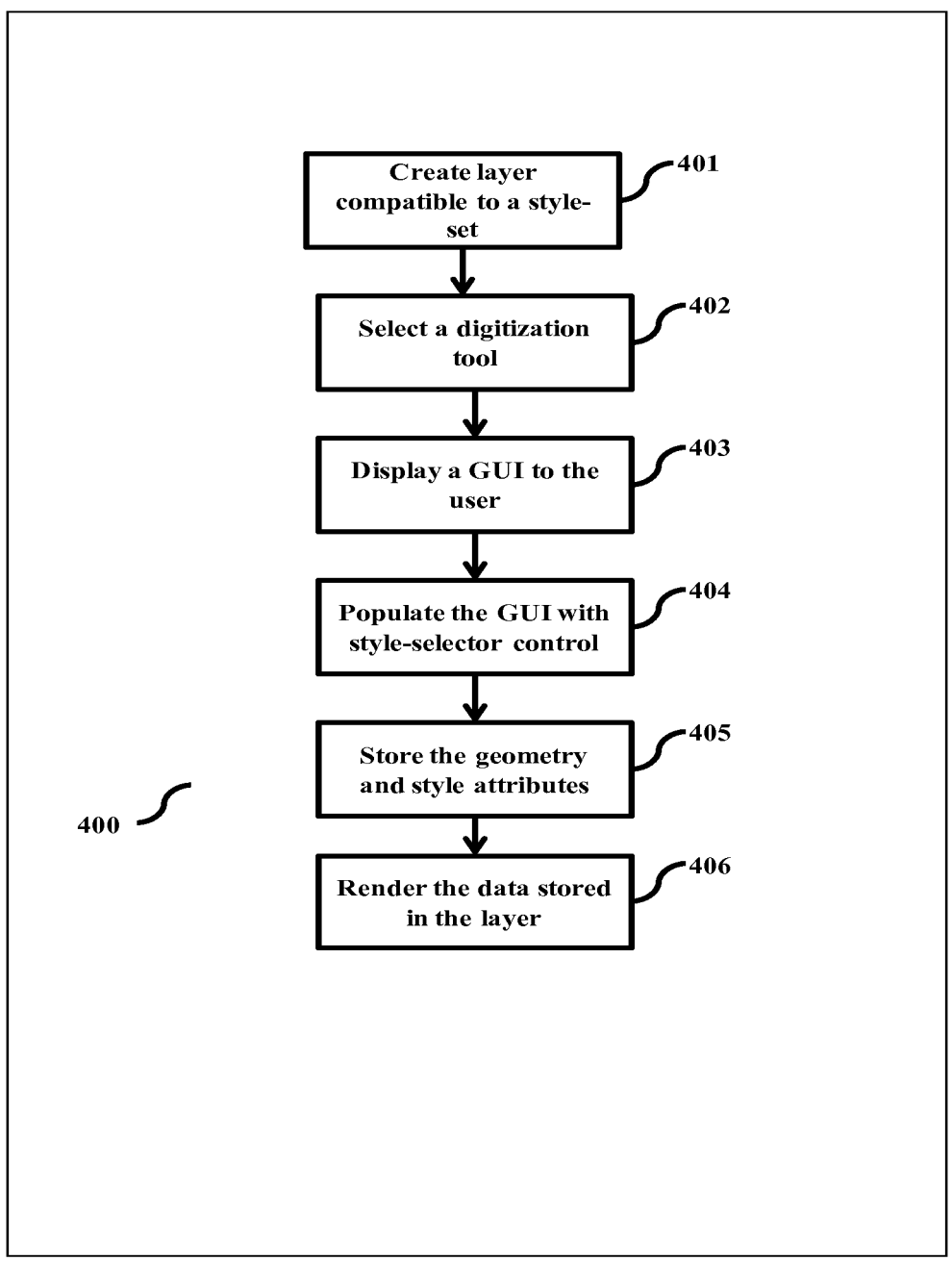
FIG. 4 is a flowchart illustrating the process of using a style sheet, according to embodiments as disclosed herein.

FIG. 4 is a flowchart illustrating the process of using a style set, according to embodiments as disclosed herein. The user creates (401) a layer that can hold data compliant to a style-set. The style-set 207 and the preferences 209 may assist the user in creating such a layer. The application reads information regarding required style attributes and their legal values, and ensures that the layer supports them. The application also associates style-set supporting style 206 with this layer. The user selects (402) a digitizing/editing tool (205), as per the requirements of the user; for example, the tool selected may be Create Line tool. The editing tool 205 displays (403) a GUI to the user, wherein the GUI enables the user to select the layer where data digitized will be stored. If the layer selected is based on specific style-set, the editing tool populates (404) the GUI with style-selector 203 control that allows the user to select style set compliant style options for the features. For example, typical style elements for a line features are color, width & patterns. A style-set may restrict the number of colors, line patterns, line width etc. that can be applied to a feature. Thus the style selector control may present only fewer choices for these attributes. After digitization, the geometry and style attributes get stored (405) in the layer's features 210. For example if the color attribute in target format allows values only from 0-255, user selects 5 as the color value on style selector control, this is the value that will be stored in the feature. The data stored in the layer is rendered (406) on map with the help of a Style object 206. For example, the style object may have mapping to map number 5 to RED color. In GIS, well defined standards like SLD (Styled Layer Descriptor) exist that describe how a layer is rendered or drawn. The SLD supports rules that may be used to construct the style 206 that contains mapping of style elements. In embodiments disclosed herein, all style elements may be present along with feature and layer. Style objects 206 refer to style attributes of the layer and helps decode information stored in them per feature. The style descriptor objects help decode values stored in the layer and provide styling information to the rendering engine 204. For example, the color value stored in a layer may actually be a color-index value from a color table. The style object may convert the color-index to actual color value and provide it to the rendering engine 204. If the intention of the style-set definition was to create data compliant to a format, when the user selects style parameters from this GUI, this information can be exported without any loss to the output file. If the intention of the style-set was to just enforce a certain sub-set of styles for any other reason, by using this GUI, the user may avoid making any mistakes in specifying style parameters that are not compliant. The various actions in method 400 may be performed in the order presented, in a different order or simultaneously. Further, in some embodiments, some actions listed in FIG. 4 may be omitted.

Embodiments disclosed herein enable restricting the choice of style elements available to users to specific set for compliance or compatibility reasons. Embodiments disclosed herein provide mapping between styling systems of different products. Embodiments disclosed herein provide customized views for each of the style sets reducing learning time for the users. Embodiments disclosed herein enable customization of products to enable/disable style sets on need basis. Embodiments discloses herein enable a reduction in digitizing errors, QA (Quality Assurance) effort, export to other format issues and so on.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for enabling a user to digitize at least one Geographic Information Systems (GIS) feature in a layer using a GIS application, the method comprising:
    creating at least one style set, wherein said style set comprises at least one style element selected by a user, wherein the style element is restricted to a specific set of parameter values based on a target format;
    enabling the user to select at least one control corresponding to the at least one style set from a GUI (Graphical User Interface);
    digitizing the at least one GIS feature based on the user applying the at least one control selected by the user;
    exporting said digitized feature to at least one of an external GIS system and a file format, wherein style information for said digitized feature is retained;
    storing the digitized GIS feature that is compliant with target format, wherein the stored digitized GIS feature comprises of a geometry and at least one style attribute corresponding to the at least one style set; and
    rendering a map based on at least one of the digitized GIS feature in the layer, wherein rendering the map comprises of mapping the at least one style attribute of the at least one feature, compliant with at least one style set from the target format, to a format used by the GIS application.

2. The method as claimed in claim 1, wherein the method further comprises of displaying the at least one control corresponding to the at least one style set to the user, on the user selecting a digitizing tool.

3. The method as claimed in claim 1, wherein the method further comprises of constructing the at least one style set, based on the target format for the digitization.

4. The method as claimed in claim 3, wherein the method further comprises of constructing the at least one style set by at least one of an authorized person and an entity.

5. The method as claimed in claim 1, wherein the rendered map depicts the at least one GIS feature in the layer using the geometry and at least one style attribute corresponding to the at least one style set.

6. A GIS (Geographic Information System) system configured for enabling a user to digitize at least one GIS feature in a layer using a GIS application, the system comprising: a Central Processing Unit (CPU) configured to:
    creating at least one style set, by said CPU, wherein said style set comprises at least one style element selected by a user, wherein the style element is restricted to a specific set of parameter values based on a target format;
    enabling the user to select at least one control corresponding to said at least one style set from a GUI (Graphical User Interface), by said CPU;
    digitizing the at least one GIS feature, by said CPU based on the user applying the at least one control selected by the user;
    exporting said digitized feature to at least one of an external GIS system and a file format, wherein style information for said digitized feature is retained;
    storing the digitized GIS feature that is compliant with the target format by said CPU, wherein the stored digitized GIS feature comprise of a geometry and at least one style attribute corresponding to the at least one style set; and
    rendering a map based on at least one of the digitized GIS feature in the layer, by said CPU, wherein rendering the map is by mapping the at least one style attribute of the at least one GIS feature, compliant with at least one style set from the target format, to a format used by the GIS application.

7. The system as claimed in claim 6, wherein the system is further configured for displaying the at least one control corresponding to the at least one style set to the user, on the user selecting a digitizing tool.

8. The system as claimed in claim 6, wherein the system is further configured for constructing the at least one style set, based on the target format for the digitization.

9. The system as claimed in claim 8, wherein the system is further configured for enabling at least one of an authorized person and an entity to construct the at least one style set.

10. The system as claimed in claim 6, wherein the rendered map depicts the at least one GIS feature in the layer using the geometry and at least one style attribute corresponding to the at least one style set.

* * * * *